(12) United States Patent
Pinkus et al.

(10) Patent No.: US 7,642,929 B1
(45) Date of Patent: Jan. 5, 2010

(54) HELICOPTER BROWN-OUT LANDING

(75) Inventors: Alan R. Pinkus, Bellbrook, OH (US); Vincent M. Parisi, Bellbrook, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 241 days.

(21) Appl. No.: 11/789,124

(22) Filed: Apr. 19, 2007

(51) Int. Cl.
   *G01C 23/00* (2006.01)
(52) U.S. Cl. .................... 340/973; 340/946; 340/970; 340/974; 345/646; 701/14
(58) Field of Classification Search ................ 340/946, 340/974, 973, 961, 963, 980, 977; 382/154; 345/633, 7, 646, 653, 654; 342/33; 701/3, 701/4, 9, 14, 16
   See application file for complete search history.

(56) References Cited

U.S. PATENT DOCUMENTS

| | | | |
|---|---|---|---|
| 2,864,970 A | | 12/1958 | Aiken |
| 2,967,905 A | | 1/1961 | Hirsch |
| 3,068,575 A | | 12/1962 | Fenske et al. |
| 3,328,795 A | | 6/1967 | Hallmark |
| 3,691,529 A | | 9/1972 | Pizante |
| 4,667,190 A | | 5/1987 | Fant |
| 4,735,503 A | | 4/1988 | Werner et al. |
| 4,835,532 A | | 5/1989 | Fant |
| 5,583,666 A | | 12/1996 | Ellson et al. |
| 5,590,261 A | | 12/1996 | Sclaroff et al. |
| 5,838,262 A * | 11/1998 | Kershner et al. ............. 340/945 |
| 6,101,431 A * | 8/2000 | Niwa et al. .................... 701/14 |
| 6,129,306 A * | 10/2000 | Pham ............................ 244/2 |
| 6,201,546 B1 | 3/2001 | Bodor et al. |
| 6,216,065 B1 * | 4/2001 | Hall et al. ..................... 701/16 |
| 6,222,937 B1 | 4/2001 | Cohen et al. |
| 6,226,004 B1 | 5/2001 | Nishihara |
| 6,570,624 B2 | 5/2003 | Cornog et al. |
| 6,573,912 B1 | 6/2003 | Suzuki et al. |
| 6,807,295 B1 | 10/2004 | Ono |
| 6,912,490 B2 | 6/2005 | Dodge |
| 6,927,886 B2 | 8/2005 | Plesniak et al. |
| 6,937,266 B2 | 8/2005 | Rui et al. |
| 6,940,653 B2 | 9/2005 | Favalora et al. |
| 7,019,682 B1 * | 3/2006 | Louberg et al. ............... 342/22 |
| 7,043,695 B2 | 5/2006 | Elber et al. |
| 7,072,704 B2 | 7/2006 | Bucholz |
| 7,076,094 B2 | 7/2006 | Chi et al. |
| 7,079,679 B2 | 7/2006 | Kirk et al. |
| 7,079,710 B2 | 7/2006 | Nagashima et al. |
| 7,098,915 B2 | 8/2006 | Appolloni |
| 7,106,217 B2 * | 9/2006 | Judge et al. .................. 340/973 |

(Continued)

*Primary Examiner*—Davetta W Goins
*Assistant Examiner*—Hoi C Lau
(74) *Attorney, Agent, or Firm*—AFMCLO/JAZ; Gerald B. Hollins

(57) ABSTRACT

An electromagnetic emissions free optical signal based helicopter landing assistance arrangement wherein helicopter rotor wash dust cloud-caused obfuscation of the intended landing site and other landing threats are overcome. Real time optical sourced data is collected early and used during helicopter approach to the intended landing site. Upgrading of this data for use during dust cloud presence is accomplished with image processing techniques applied in response to such inputs as helicopter flight data. Military use of the invention especially in current theatre conflict environments is contemplated. Dust cloud related landing hazards are disclosed as a significant difficulty in such environments and generate need for the invention.

12 Claims, 3 Drawing Sheets

U.S. PATENT DOCUMENTS

| | | |
|---|---|---|
| 7,107,081 B1 | 9/2006 | Fujisaki |
| 7,116,341 B2 | 10/2006 | Ohto |
| 7,117,026 B2 | 10/2006 | Shao et al. |
| 7,119,351 B2 | 10/2006 | Woelki |
| 7,119,831 B2 | 10/2006 | Ohto et al. |
| 7,365,652 B2* | 4/2008 | Scherbarth .................. 340/974 |
| 7,379,164 B2* | 5/2008 | Inbar et al. .................. 356/5.04 |
| 7,456,779 B2* | 11/2008 | Cross et al. ............... 342/25 A |
| 2003/0043058 A1* | 3/2003 | Jamieson et al. ............. 340/961 |
| 2003/0222887 A1* | 12/2003 | Wilkins et al. .............. 345/618 |
| 2004/0105573 A1* | 6/2004 | Neumann et al. ............ 382/103 |
| 2004/0217883 A1* | 11/2004 | Judge et al. .................. 340/946 |
| 2006/0087452 A1* | 4/2006 | Scherbarth .................. 340/974 |
| 2006/0176303 A1* | 8/2006 | Fairclough ................... 345/426 |
| 2006/0250497 A1* | 11/2006 | Inbar et al. ..................... 348/31 |
| 2008/0074312 A1* | 3/2008 | Cross et al. ................ 342/25 A |
| 2009/0002220 A1* | 1/2009 | Lovberg et al. ............... 342/33 |

\* cited by examiner

HELICOPTER BROWN-OUT LANDING

RIGHTS OF THE GOVERNMENT

The invention described herein may be manufactured and used by or for the Government of the United States for all governmental purposes without the payment of any royalty.

BACKGROUND OF THE INVENTION

A helicopter attempting to land on sandy or dusty terrain is often enveloped by a dense cloud of dust and particles in a condition that has become known as a "brown-out". This condition obscures the pilot's vision so severely as to make such a landing a safety threat to the aircraft and to persons in the aircraft and on the ground. The nose-up landing posture often needed for such a landing contributes to the danger of the landing by also making the observation of the helicopter final destination site and interfering features such as vehicles, persons, ground features and structures more difficult. Events of this type became notably newsworthy several years ago in connection with the 1980 attempt to rescue American hostages from captivity in Iran as was authorized by President Jimmy Carter, see for example the published article titled "The Desert One Debacle" appearing in a more recent, May 2006, issue of the magazine THE ATLANTIC MONTHLY. Numerous other items of press coverage of the events preceding and succeeding this rescue attempt appeared in publications originating near the time of the event. The present invention provides significant relief for certain helicopter threats encountered during this rescue attempt and under similar conditions.

SUMMARY OF THE INVENTION

The present invention therefore provides for enhanced knowledge of an anticipated helicopter landing site.

It is therefore an object of the present invention to provide this enhanced knowledge during a helicopter landing interval when normal pilot vision is precluded by helicopter rotor wash dispatched dust clouds.

It is another object of the invention to provide a prediction-based view of an obscured helicopter landing site.

It is another object of the invention to apply a conversion between helicopter flight parameters and updated helicopter landing site characteristics.

It is another object of the invention to apply a conversion between helicopter flight parameters obtained from an inertial navigation system and an updated three-dimensional landing site graphic representation of a landing site.

It is another object of the invention to provide helicopter landing site photographic or graphic characteristics based on data received from a plurality of differing helicopter terrain sensors.

It is another object of the invention to use three-dimensional data achieved by sensing a sequence of two- or three-dimensional data events preceding a helicopter landing sequence.

It is another object of the invention to provide a three-dimensional graphic model usable by a pilot during the final phases of a helicopter landing sequence.

It is another object of the invention to provide a predictive display for a helicopter landing that is updated from a helicopter internal navigation system source in response to a brown-out event.

It is another object of the invention to provide a predictive display for a helicopter landing that is updated from yaw, pitch, roll, altitude and speed data available within a helicopter internal navigation system.

It is another object of the invention to provide assistance for a current priority problem for U.S. Air Force military personnel.

It is another object of the invention to provide helicopter landing assistance to military Special Forces and others employing helicopters under hostile operating conditions.

It is another object of the invention to preclude the occurrence of a helicopter landing related unsuccessful military campaign as occurred to American forces in Iran in 1980.

It is another object of the invention to provide a helicopter landing assistance apparatus that is electromagnetically passive and non-signature emitting.

It is another object of the invention to provide a helicopter landing assistance apparatus suited to use in covert military operations situations.

It is another object of the invention to provide a helicopter landing assistance apparatus in which a plurality of differing input signal wavelengths may be selected in response to varying environment conditions.

It is another object of the invention to provide a helicopter landing assistance apparatus in which a plurality of differing output display communication forms may be selected.

It is another object of the invention to provide a helicopter landing assistance apparatus in which a plurality of differing output communication settings, e.g. perspectives relevant to different aircraft crew stations, may be selected.

It is another object of the invention to provide a helicopter landing assistance apparatus which may include alarms responsive to safe landing preclusion conditions.

It is another object of the invention to provide a helicopter landing assistance system that may be helpful during certain winter weather or "white-out" conditions.

It is another object of the invention to provide a helicopter landing assistance apparatus that may be adapted for use in a dust encumbered spacecraft landing situation.

These and other objects of the invention will become apparent as the description of the representative embodiments proceeds.

These and other objects of the invention are achieved by an enhanced safety method of landing a helicopter in a loose dust area, said method comprising the steps of:

recording digital multiple image two-dimensional representations of a proposed helicopter landing site in said loose dust area during an approach of said helicopter to said site;

said recordings including a time sequence succession of updated images of terrain and encumbrances attending said landing site received at a plurality of helicopter mounted camera retinas during said recording and said approach to said landing site;

constructing three-dimensional representations of said loose dust landing site terrain and said encumbrances from said recorded multiple image succession two-dimensional representations using image processing techniques;

conveying a real time image of said landing site from said camera retinas to a pilot of said helicopter during distal portions of said approach and prior to dust cloud envelopment of said helicopter; and displaying selected images of said constructed three-dimensional representations of said landing site terrain and said encumbrances to said pilot during ground adjacent, helicopter dust cloud enveloped, portions of said approach.

BRIEF DESCRIPTION OF THE DRAWINGS

The accompanying drawings incorporated in and forming a part of this specification, illustrate several aspects of the present invention and together with the description serve to explain the principles of the invention. In these drawings.

DETAILED DESCRIPTION

Figure 1:
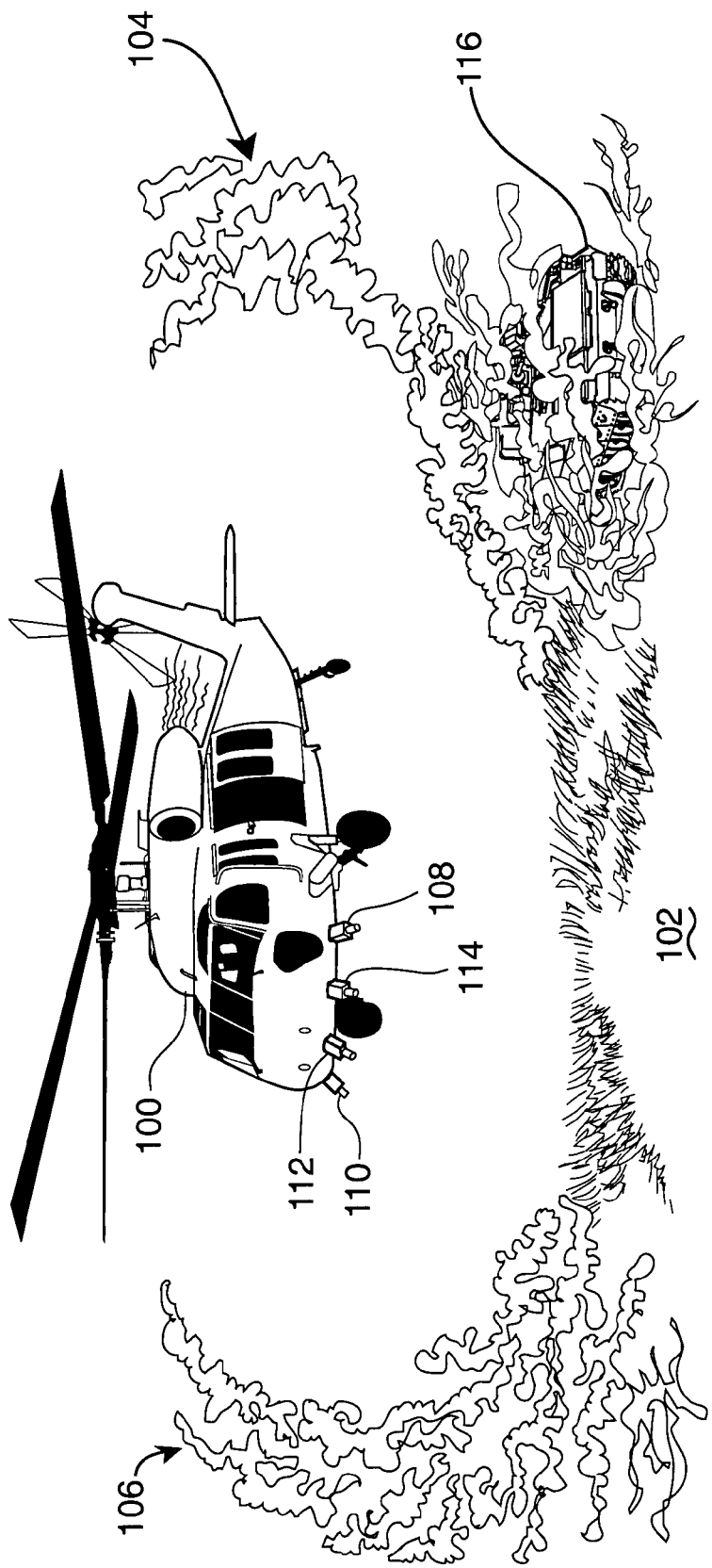
FIG. 1 shows a helicopter according to the present invention in a dust cloud obfuscated landing event.

The downdraft rotor wash of a helicopter can result in a significant safety problem when the helicopter is attempting to land on, for example, an unpaved surface in a location wherein sand or other loose earth components prevail. Current war theatres such as in Iraq, Saudi Arabia and parts of Afghanistan as well as portions of the continental United States include prime examples of these soil and earth conditions. Since the helicopter of concern is yet airborne during parts of such landing events and the open throttle coupled rotor can be as close as ten to fifteen feet from the earth's surface, it is common for significant clouds of particle-laden dust to develop around the helicopter from this rotor wash and for this dust to obscure a needed view of the landing area from the helicopter pilot. Such obscuration tends to increase as the helicopter approaches the earth and usually becomes worst at the most inopportune moment in the landing sequence, i.e., in the seconds just before touchdown, when viewing of the landing site is most needed. In this situation the obscuring dust clouds can be as high as 100 feet. Problems of this nature are in fact, presently considered to be of first priority importance to U.S. Air Force and especially to Special Operations personnel, since they are often deployed and returned by helicopter into situations involving a variety of little-known and non-optimal landing conditions.

In the military environment for a helicopter, there are clearly considerations a landing help system of the present invention type should observe in order to be as combat safe as possible and be optimally adapted to predictable needs for the system. For covert military usage, for example, it is desirable that a helicopter be totally emitted signal passive and provide no source of electromagnetic radiation that may be used to learn of helicopter presence and identification or used by weapons directed against the aircraft. The use of camera data sources and internal navigation system sourced data as espoused in the present invention system is considered a desirable accommodation of these requirements.

Military equipment should also accommodate variations in environmental conditions. In the present instance, this requirement imposes a need to accept input signal wavelengths as may be optimally adapted to diverse conditions incurred during day or night or inclement weather landing events. Implied in such accommodation is selected system responsivity to visible, near infrared, medium infrared and thermal image sensing transducers and involving wavelengths between 1 and 12 microns—all as are usually provided by a plurality of different camera types. Helicopter aircraft space and weight limitations can of course ultimately limit the camera and wavelength accommodations possible.

Flexibility with respect to communication of landing zone information to the helicopter pilot is also a consideration with respect to such systems. In addition to perspective alteration as appears desirable to optimize landing system output data for best comprehension by a pilot or a co-pilot or other crew members (who may be concerned with aircraft protection duties for example) it is possible to present this data in the form of a simple heads-down instrument panel cathode ray tube display or in more sophisticated heads-up or helmet involved manners—as may include stereo optic viewing. The present brown out system contemplates use of one or more of these variations.

The avoidance of both permanent and temporary landing zone irregularities is also important for helicopter pilots. Such irregularities may include naturally occurring features such as crevices, boulders, undulating ground and slopes exceeding ten degrees and may also include such man made objects as fences, persons and vehicles or vehicle sized objects. Avoidance of each of these and other hazards is believed significantly assisted by the present invention during both presence and absence of the primary focus dust cloud situations.

FIG. 1 in the drawings shows a scene wherein a military helicopter 100 is seeking to land on a dry and arid, dusty portion of the earth 102 and is in this process stirring-up a plurality of dust clouds 104 and 106 tending to obscure the intended landing area and its distance from the helicopter. Additionally present in the FIG. 1 scene is a partially buried portion of a military hardware object, a battle tank 116, remaining after earlier military action in the intended landing area. Also represented in the FIG. 1 drawing are several helicopter-mounted sensors/cameras 108 and 110 and 112 and 114 providing input to a present invention landing assistance apparatus. This assistance is based on terrain information gathered prior to occurrence of dust clouds 104 and 106 and from other passively obtained sources. More about these cameras and other sensors and their desired capabilities appears subsequently herein.

Figure 2:
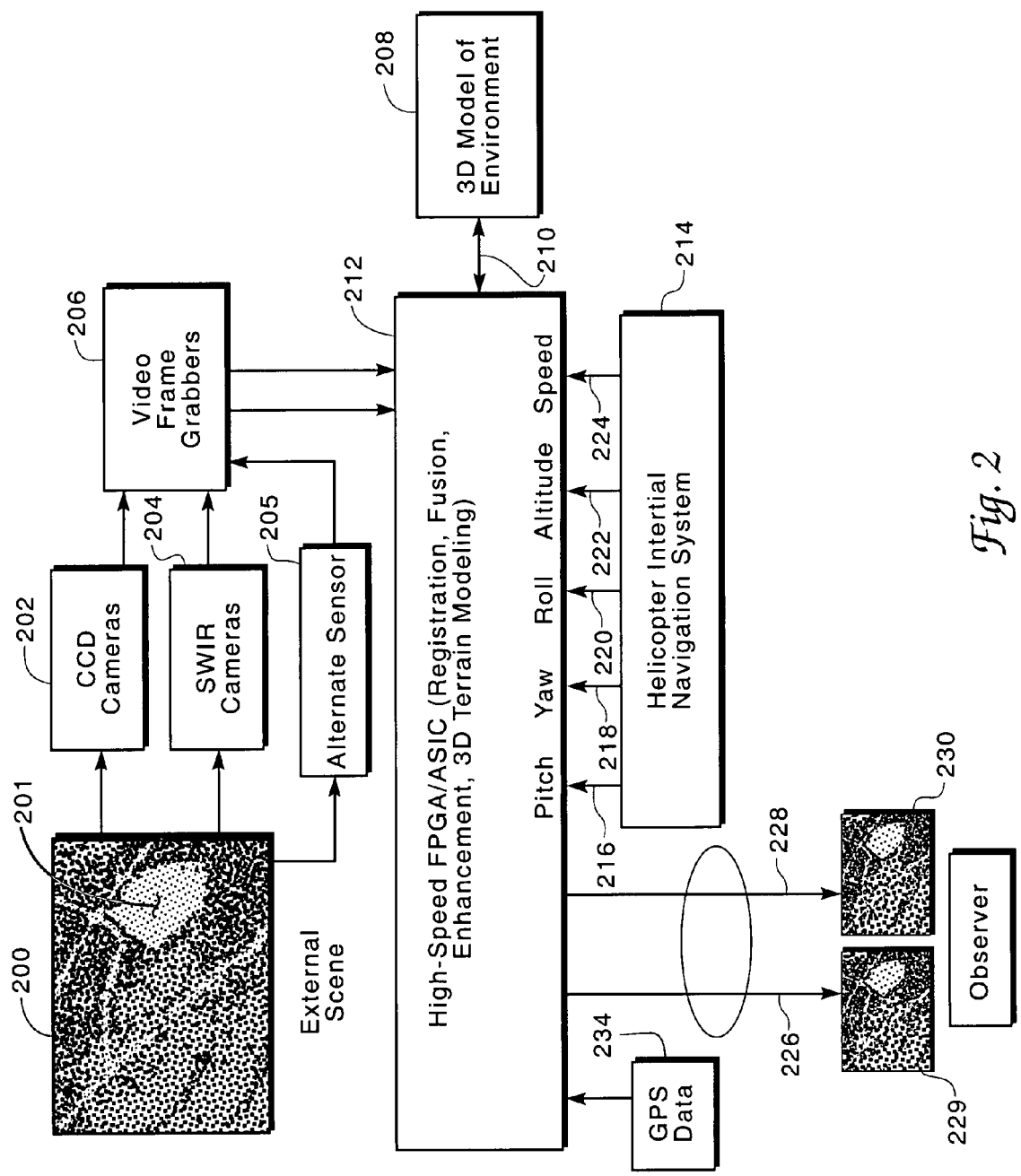
FIG. 2 shows a block diagram of a helicopter dust cloud alleviation landing system according to the present invention in a pre-dust cloud occurrence situation.

FIG. 2 in the drawings shows a first block diagram of a helicopter sensor/camera data processing system usable to provide assistance to the helicopter pilot during the FIG. 1 or another difficult landing sequence. In the FIG. 2 drawing there appears a representative outdoor scene 200 inclusive of a possible helicopter landing site 201 and three sensor arrays 202, 204 and 205 providing information relating to the scene 200 to the helicopter disposed data computer 212 and to a pilot/observer. In this FIG. 2 system, the sensor array at 202 may be of the charge coupled device camera type as indicated in the FIG. 1 drawing, and may also include, for example, a pair of cameras. The sensor array at 202 may alternately involve a rotating or otherwise mechanically displaced camera. The camera at 204 may also be a camera pair and may be of the short-wave infrared type as represented in the drawing. The sensor 205 in FIG. 1 may be of some selected alternate type such as a night vision camera pair, or possibly a radar apparatus. A camera pair such as shown at 108 and 110 in the FIG. 1 drawing may be used to embody the camera pair 202 in FIG. 2. Similarly the camera pair 112 and 114 in the FIG. 1 drawing may be used to embody the camera pair 204 in FIG. 2. Except for a possible ladar (i.e., laser-based radar) or electronic radar apparatus used at 205, the FIG. 2 identified sensors are of the preferable passive and non-detectable types, most ladar and radar systems however include an emitted signal and are thus subject to undesirable enemy detection and adverse usage in a hostile environment helicopter landing situations.

Also included in the FIG. 2 system is a video frame grabber data apparatus 206 used to segregate continuous electronic signal data emitted by the cameras and detector 202, 204 and 205 into integral frame data for storage and processing in the computer 212. Such a frame grabber receives a continuous flow of analog data then performs discrete sampling of the data for storage and additional manipulation. Although the computer 212 in FIG. 2 may be embodied as a programmed general purpose computer, it is preferable to use either a field-programmable gate array (FPGA) or an Application Specific Integrated Circuit (ASIC) in a wired hardware arrangement in order to achieve optimum computer operation at 212. A computer embodied in the form of a field-programmable gate array or an Application Specific Integrated Circuit can often be made to perform a particular function in a shorter time, with lower power requirements and with lowered weight and size penalties with respect to a software programmed general purpose computer.

Additional parts of the helicopter landing data processing system shown in the FIG. 2 diagram include the helicopter inertial navigation system 214 and several typical output signals obtainable from such an aircraft flight control apparatus. These signals may include aircraft pitch, yaw and roll data as shown at 216, 218 and 220 and also aircraft altitude and speed information as shown at 222 and 224. Global Positioning System (GPS) data from a helicopter-borne GPS system may also be used in the present invention data processing, as is represented at 234 in FIG. 2. Generally these block 214 signals are used to enable prediction of helicopter aircraft landing related conditions existing after the visual observation interval for a landing site has terminated and occurrence of the pilot brown-out event, with visual data no longer available, has ensued. The visual input data received from the scene 200 can be used to realize a three-dimensional model of the helicopter landing environment, as is accomplished in the block 208 of FIG. 2. The two-way information communication indicated for the path 210 of block 208 permits input of a succession of two-dimensional data scene frames and output of three-dimensional data determined from this succession of two-dimensional data. The data flowing along the path 210 may be summarized as a continuous data build or update prior to entering the brown-out event.

Stereoscopic display information including the real-time visual data obtained from the scene 200 during approach to and upon commencing the helicopter landing together with predictions of changes in such visual data occurring after the brown-out event are output from the FIG. 2 system by the pair of output signals communicated along paths 226 and 228 to the observer or pilot 232. As represented at 229 and 230 in FIG. 2, this stereoscopic data is similar to that shown at 200 except for the usual slight difference resulting from displaced locations of the stereoscopic cameras on the helicopter 100. The data flowing along the paths 226 and 228 prior to the brown-out event may be summarized as the external scene displayed from the camera's input at the pilot's current point of view. Changes occurring in the data 200 after brown-out event initiation may be elicited by way of the aircraft flight data signals originating at 214 and are also present in the output signals represented at 229 and 230. These changes are considered herein in connection with the FIG. 3 drawing. The stereoscopic data in the scenes 229 and 230 may be conveniently communicated to the pilot 232 by way of a heads up display apparatus or other visual display arrangements. A stereoscopic display to the helicopter pilot as described here may be optimal, however, it is recognized that design and monetary concerns can impose a need to use other less costly data communication arrangements including, for example, a monocular display in at least some aircraft.

The generation of three-dimensional data for various purposes including aircraft related purposes and including three-dimensional data obtained from a plurality of two-dimensional sources is believed to be within common practice in the image processing art and moreover is disclosed in a number of prior-issued U.S. patents. Included in these patents are: U.S. Pat. Nos. 7,119,831; 7,119,351; 7,116,341; 7,107,081; 7,098,915; 7,076,094; 7,072,704; 6,226,004; 6,201,546; 3,691,529; 3,328,795; 3,068,575 and 2,967,905. Each of these patents is hereby incorporated by reference herein.

Figure 3:
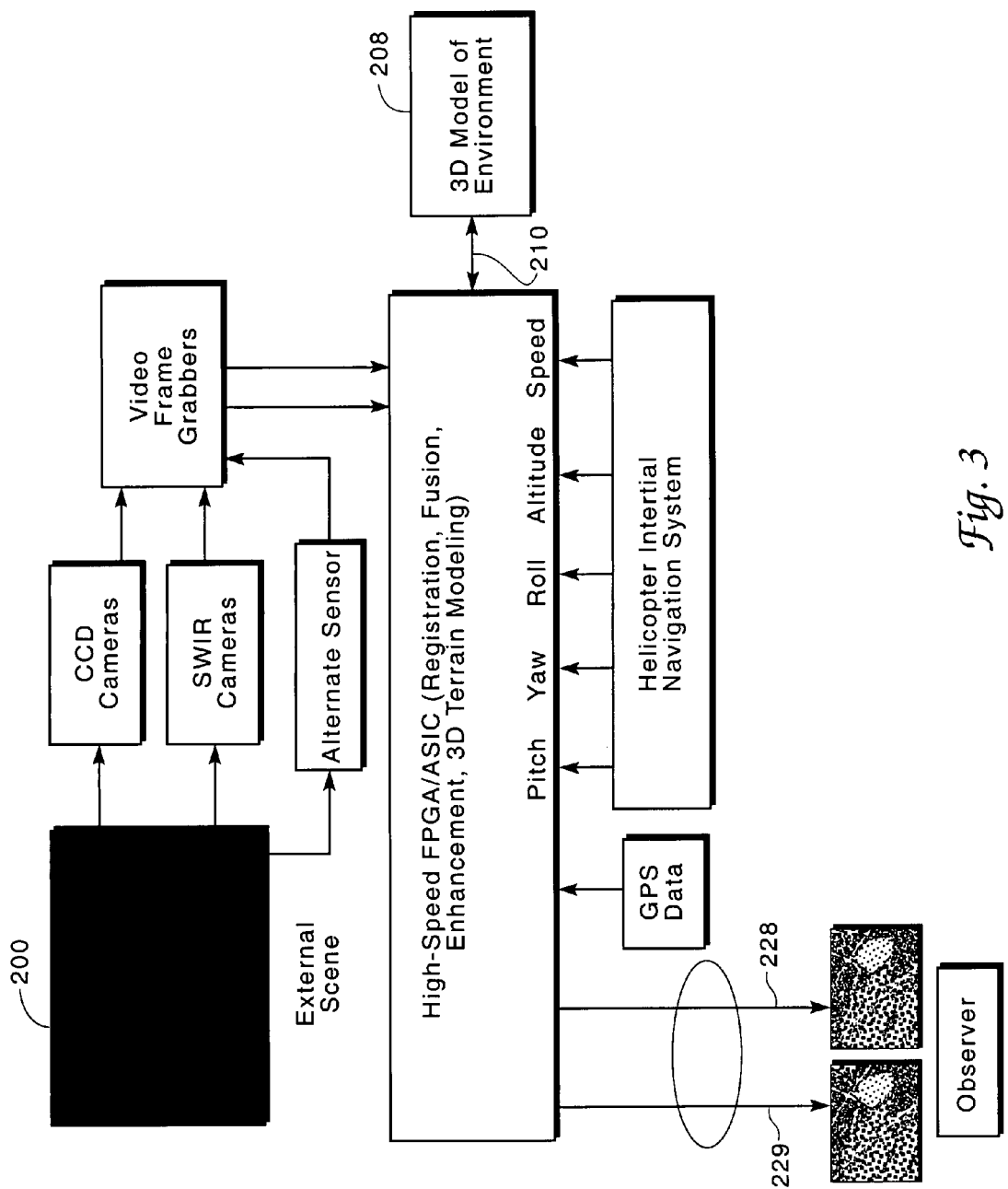
FIG. 3 shows a block diagram of a helicopter post-dust cloud presence landing system according to the present invention.

FIG. 3 in the drawings is similar to the FIG. 2 drawing except for the brown-out event having occurred in FIG. 3 and data from the external scene of block 200 in FIG. 2 being thus now totally absent. Under these conditions the FIG. 2 system receives landing site upgrade data from the block 208 storage in response to aircraft changes received from the blocks 214 and 234 aircraft navigation and GPS sources, respectively. This upgrade data is in the form of a prediction or interpolation as to how changes in aircraft position have caused the pilot view of the landing site to also be upgraded. The data flowing along the path 210 in FIG. 3 may be summarized as a virtual three-dimensional data model from storage after entering the brown-out event. The data flowing along FIG. 3 paths 226 and 228 after commencement of the brown-out event may be summarized as the external scene recreated from a stored model in a scaled and reoriented to the pilot's changing point of view form.

A plurality of processing algorithms are available for use in fabricating a pilot's current view of a landing site from the stored pre brown-out site data as is needed in the previous paragraph. Even though the process known in the art as "morphing" of a first object view into one or more altered object views may not be optimum for the change needed in such a helicopter brown-out landing, this processing appears to have partial utility for present purposes. Morphing is commonly practiced in the environment of commercial television, particularly in advertising based video sequences. Morphing computer software is in fact now also available commercially at low cost under such names as FantaMorph, MorphBuster, and Morpheus and by way of sources identifiable for example by a Google® search of the World Wide Web. In addition U.S. Pat. Nos. 7,117,026; 6,573,912; 6,570,624; 5,590,261 and 5,583,666 along with the patents classified in U.S. Patent and Trademark Office search classes 345, 348, 358 and 382 disclose technical details of processing in which a first image may be changed into a related but differing second image as accomplished in the FIG. 2 described processing. These documents are hereby incorporated by reference herein.

In a manner relative to the above described two-dimensional to three-dimensional data transformation and also somewhat relating to the previously described morphing of a first image into a second related but differing image, it is now also common practice in the computer display art and elsewhere to obtain a first perspective view of an object from stored data and by computer data manipulation to obtain a second and subsequent views of the same object upon request. These subsequent views of the same object may represent the object's appearance from a different azimuthal location or from a viewing point located closer or at a greater distance from the object, i.e., a view obtained from a different perspective. Such data processing may also be included in the block 212 processing of the present invention to accommodate a re-orientation rotation of the helicopter to a different compass heading during the landing sequence and subsequent to commencement of the brown-out event. The accomplishment of such re-orientation processing is disclosed in U.S. Pat. Nos. 7,079,710; 7,079,679; 7,043,695; 6,940,653; 6,937,266; 6,927,886; 6912,490; 6,807,295 and 6,222,937 and 6,807,295, for examples, and also in other patents included in U.S. Patent and Trademark Office search class 382/154. Image processing involving three-dimensional and stereoscopic processing is to be found in these patents. These patents are also hereby incorporated by reference herein.

As is demonstrated by each of these specific patent related examples of currently used data processing techniques being usable in the block 212 processing of the present invention, each of the described and possibly other data processing types needed in the block 212 processing of the present invention is believed available in the patent or publication art. The combination of these processing techniques and their use in the landing of a helicopter under adverse conditions is believed to be a new contribution to the aviation and data processing arts and to provide solution of an acute real-world problem faced by the United States military. The fundamental principles of the invention may, of course, be extended beyond the realm of helicopter aircraft and used, for example, with an unmanned aircraft or with a space vehicle during an earth or solar system or planetary landing sequence.

It is particularly notable that the helicopter landing arrangement of the present invention may be considered to be both passive and autonomous in nature. There is absence of need for emitted signals in the preferred embodiments of the invention. This passive nature is coupled with an ability to rely on already available and stored old data and new current flight data to achieve an important new purpose and provide believed significant improvements in the helicopter aviation art.

The foregoing description of the preferred embodiment has been presented for purposes of illustration and description. This description is not however intended to be exhaustive or to limit the invention to the precise form disclosed. Obvious modifications or variations of the described invention are possible in light of the preceding teachings. The disclosed embodiment was chosen and described to provide illustration of the principles of the invention and its practical application and to thereby enable one of ordinary skill in the art to utilize the invention in various embodiments and with various modifications as are suited to the particular scope of the invention as determined by the appended claims when interpreted in accordance with the breadth to which they are fairly, legally and equitably entitled.

We claim:

1. An electromagnetic emissions-passive and autonomous enhanced safety method of landing a helicopter in a loose dust area, said method comprising the steps of:
    recording digital multiple image two dimensional optical representations of a proposed helicopter landing site in said loose dust area during an approach of said helicopter to said site;
    said recordings including a time sequence succession of updated images of terrain and encumbrances attending said landing site received at a plurality of helicopter mounted camera retinas during said recording and said approach to said landing site and in combination with helicopter flight data;
    constructing three dimensional representations of said loose dust landing site terrain and said encumbrances from said recorded multiple image succession two dimensional representations using image processing techniques;
    conveying a real time image of said landing site from said camera retinas to a pilot of said helicopter during distal portions of said approach and prior to dust cloud envelopment of said helicopter;
    displaying selected images of said constructed three dimensional representations of said landing site terrain and said encumbrances to said pilot during ground adjacent, helicopter dust cloud enveloped, portions of said approach;
    wherein displaying selected images includes morphing said time sequence succession of updated images of terrain and encumbrances attending said landing site in response to helicopter flight data signals;
    whereby electromagnetic emission free dusty landing assistance is provided to said pilot.

2. The electromagnetic emissions-passive and autonomous enhanced safety method of landing a helicopter in a loose dust area of claim 1 wherein said helicopter mounted camera retinas further include one of a night vision apparatus, a radar return signal transducer and an infrared responsive transducer.

3. The electromagnetic emissions-passive and autonomous enhanced safety method of landing a helicopter in a loose dust area of claim 1 wherein said step of conveying real time images of said landing site from said camera retinas to a pilot of said helicopter includes updating said real time images in response to helicopter location changes with respect to said landing site.

4. The electromagnetic emissions-passive and autonomous enhanced safety method of landing a helicopter in a loose dust area of claim 1 wherein said step of displaying selected images of said constructed three dimensional representations of said landing site terrain and said encumbrances to said helicopter pilot includes initiating said real time images in response to helicopter flight data signals.

5. The electromagnetic emissions-passive and autonomous enhanced safety method of landing a helicopter in a loose dust area of claim 3 wherein said helicopter flight data signals include one of a helicopter pitch, yaw, roll altitude and speed signals and a global position system signal.

6. The electromagnetic emissions-passive and autonomous enhanced safety method of landing a helicopter in a loose dust area of claim 1 wherein said step of displaying selected images of said constructed three-dimensional representations of said landing site terrain and said encumbrances to said pilot during ground adjacent, helicopter dust cloud enveloped, portions of said approach include displaying said images during a nose-up landing attitude of said helicopter.

7. The electromagnetic emissions-passive and autonomous enhanced safety method of landing a helicopter in a loose dust area of claim 1 wherein said step of constructing three dimensional representations of said dusty landing site terrain and said encumbrances from said recorded multiple image succession of two dimensional representations using image processing techniques includes image morphing signal processing.

8. The electromagnetic emissions-passive and autonomous enhanced safety method of landing a helicopter in a loose dust area of claim 6 wherein said helicopter mounted camera retinas further include one of a night vision apparatus, a radar return signal transducer and an infrared responsive transducer.

9. The electromagnetic emissions-passive and autonomous enhanced safety method of landing a helicopter in a loose dust area of claim 6 wherein said step of conveying real time images of said landing site from said camera retinas to a pilot of said helicopter includes updating said real time images in response to helicopter location changes with respect to said landing site.

10. The electromagnetic emissions-passive and autonomous enhanced safety method of landing a helicopter in a loose dust area of claim 6 wherein said step of displaying selected images of said constructed three dimensional representations of said landing site terrain and said encumbrances to said helicopter pilot includes initiating said real time images in response to helicopter flight data signals.

11. The electromagnetic emissions-passive and autonomous enhanced safety method of landing a helicopter in a loose dust area of claim 9 wherein said helicopter flight data signals include one of a helicopter pitch, yaw, roll altitude and speed signals and a global position system signal.

12. The electromagnetic emissions-passive and autonomous enhanced safety method of landing a helicopter in a loose dust area of claim 6 wherein said step of constructing three dimensional representations of said dusty landing site terrain and said encumbrances from said recorded multiple image succession of two dimensional representations using image processing techniques includes image morphing signal processing.

\* \* \* \* \*